United States Patent [19]
Salter et al.

[11] Patent Number: 5,590,605
[45] Date of Patent: Jan. 7, 1997

[54] CONVEYING DEVICE WITH SELF STEERING POWERED CASTER

[75] Inventors: Kenneth D. Salter, Glendale; Daniel A. Armstrong, Simi Valley; Ted W. Fredrick, Saugus, all of Calif.

[73] Assignee: The Walt Disney Company, Burbank, Calif.

[21] Appl. No.: 560,828

[22] Filed: Nov. 20, 1995

[51] Int. Cl.⁶ .......................... B61F 13/00; B61B 12/02
[52] U.S. Cl. .......................... 104/139; 104/53; 104/242; 180/401
[58] Field of Search .......................... 104/139, 140, 104/53, 242, 244.1, 247; 105/72.2; 180/401; 280/776, 81.6

[56] References Cited

U.S. PATENT DOCUMENTS

| | | |
|---|---|---|
| 779,351 | 1/1905 | Douglas . |
| 981,131 | 1/1911 | Spangler . |
| 1,256,558 | 2/1918 | Hild . |
| 1,317,518 | 9/1919 | MacFarren . |
| 1,750,559 | 3/1930 | Adams . |
| 1,880,953 | 10/1932 | Fageol . |
| 1,883,357 | 10/1932 | Fageol . |
| 1,981,655 | 11/1934 | Lucke, Jr. . |
| 2,101,024 | 12/1937 | Heinze . |
| 2,181,377 | 11/1939 | Mabie ........................ 104/247 X |
| 2,207,167 | 7/1940 | Stoltz . |
| 3,031,024 | 4/1962 | Ulinski . |
| 3,557,707 | 1/1971 | Joy . |
| 3,756,335 | 9/1973 | Eisele et al. . |
| 3,807,312 | 4/1974 | Flodell . |
| 3,865,208 | 2/1975 | Crawshay et al. . |
| 3,881,427 | 5/1975 | Blume . |
| 3,942,449 | 3/1976 | Nelson ........................ 104/242 X |
| 4,078,630 | 3/1978 | Krieg . |
| 4,083,310 | 4/1978 | Emori et al. ........................ 104/242 |
| 4,125,169 | 11/1978 | Harris et al. . |
| 4,483,405 | 11/1984 | Noda et al. . |
| 4,800,977 | 1/1989 | Boegli et al. . |
| 4,843,810 | 7/1989 | Kabilka et al. . |
| 5,004,061 | 4/1991 | Andruet . |
| 5,012,886 | 5/1991 | Jonas et al. ........................ 180/401 X |
| 5,058,016 | 10/1991 | Davidovitch . |
| 5,123,357 | 6/1992 | Fujita et al. . |
| 5,222,568 | 6/1993 | Higasa et al. . |
| 5,456,184 | 10/1995 | Fritz ........................ 104/139 |

FOREIGN PATENT DOCUMENTS

| | | | |
|---|---|---|---|
| 3905301 | 8/1990 | Germany ........................ 180/131 |
| 603469 | 6/1948 | United Kingdom ........................ 104/247 |
| WO8800544 | 1/1988 | WIPO ........................ 180/131 |

Primary Examiner—Robert J. Oberleitner
Assistant Examiner—Kevin D. Rutherford
Attorney, Agent, or Firm—Keith A. Newburry; Pretty, Schroeder, Brueggemann & Clark

[57] ABSTRACT

A transport system for moving along a track on a support surface. The system includes a body, a guide system and a powered self-steering caster assembly. The guide system cooperates with the track to apply lateral forces to the body to guide it along a predetermined path when a propulsive force is applied to the body. The powered self-steering caster assembly has a pivot joint and a wheel driven by a motor. The wheel has a center of rotation and is rotatably mounted to engage the support surface and roll in a forward direction. The pivot joint is mounted to the body to allow the wheel to pivot about a predetermined axis intersecting the support surface forward of the engagement between the wheel and the support surface. The wheel drives the body and pivots in response to frictional side slip forces between the wheel and the support surface without restraint from a steering linkage. An optional viscous damper mounted between the body and the caster assembly allows operation of the transport system at speeds in excess of those available without such a damper.

28 Claims, 5 Drawing Sheets

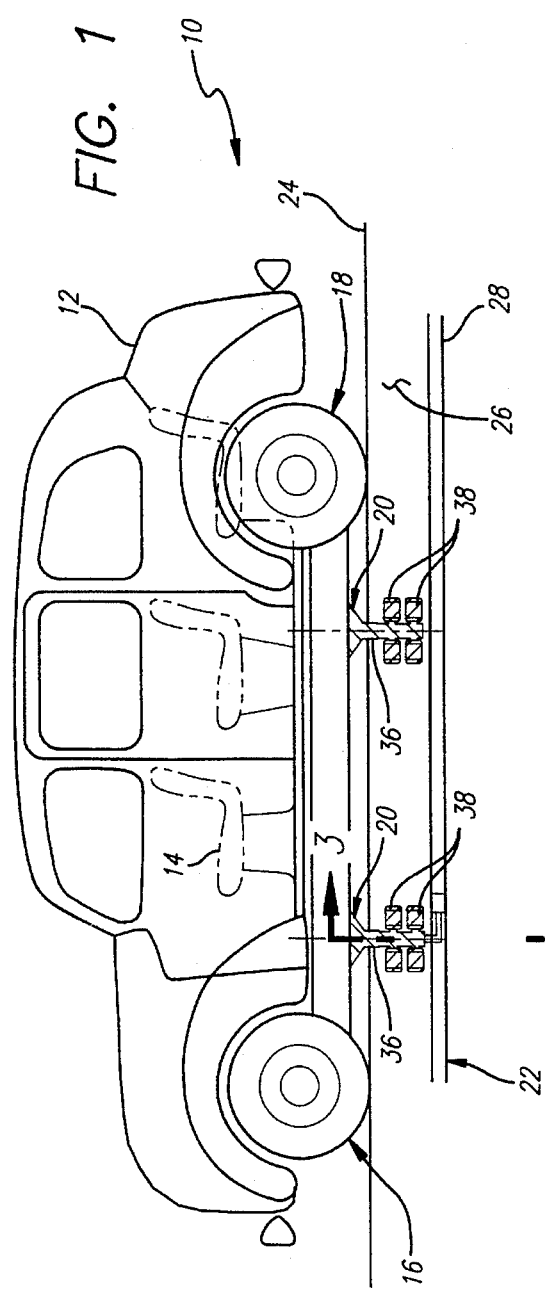
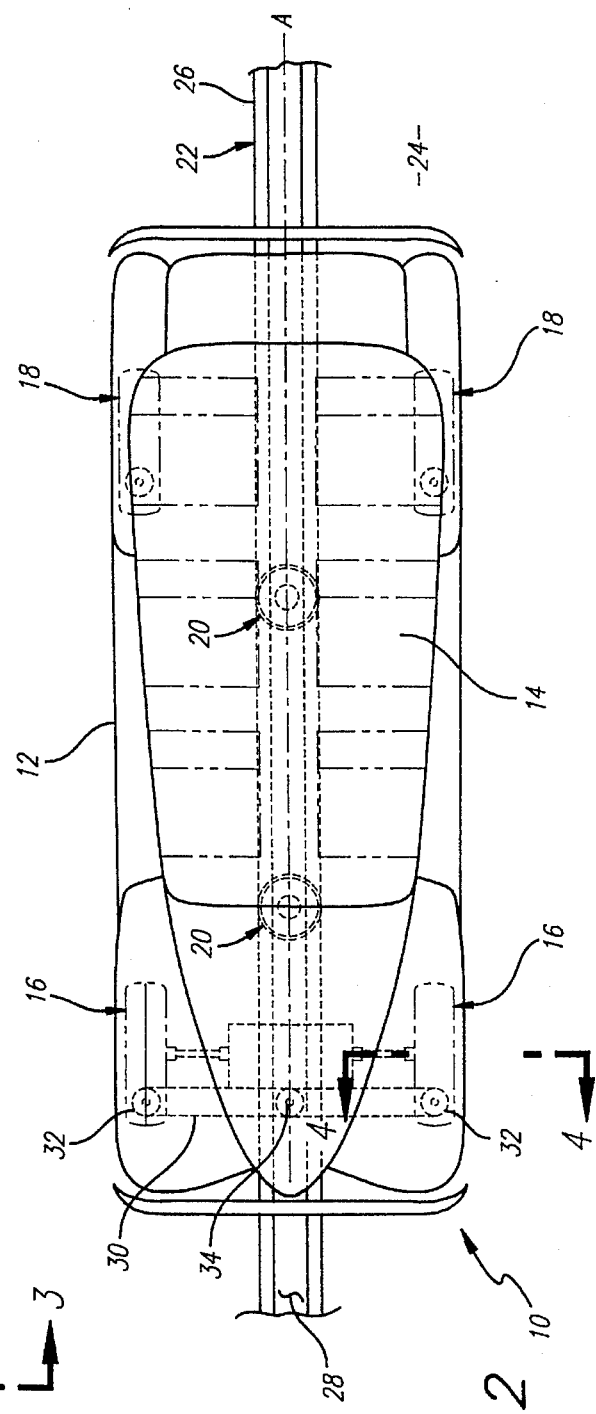

CONVEYING DEVICE WITH SELF STEERING POWERED CASTER

BACKGROUND OF THE INVENTION

This invention relates to transport systems and, more specifically, to guest conveyance systems for amusement park rides and the like.

In amusement park settings, a variety of transportation systems are utilized for conveyance purposes. In an amusement park, a guest conveyance system is used to move guests along a predetermined path through a ride or attraction. Such a guest conveyance system can include vehicles that are each equipped with one or more bogies, which are guides that slide along a track to steer the vehicle along the predetermined path. When one of the bogies slides along a curved section of the track, that bogie applies turning forces to the vehicle. These turning forces act in a direction perpendicular to the direction of the vehicle's travel. The vehicle also has a drive system that applies forces parallel to the direction of travel to increase and decrease the vehicle's speed as it moves through a particular ride. Such a drive system can include powered wheels and tires mounted under the vehicle to engage a horizontal surface adjacent to the track. The powered wheels are aligned to rotate in a vertical plane parallel to the direction of travel of the vehicle and thereby provide needed propulsive and braking forces as the vehicle moves through the attraction.

One drawback associated with such an arrangement is that the wheels must be steered to avoid excess tire wear. If the wheels are not steered to maintain their alignment in a direction parallel to the vehicle's direction of travel, side slip forces from the bogies are applied to the wheels as the vehicle turns. These side slip forces cause the wheels to skid sideways as the vehicle negotiates turns, thereby resulting in undesirable wear and inflated power requirements for the drive system. Such tire wear is especially expensive because of the labor costs associated with replacing worn tires in an amusement ride having many vehicles. Further, such tire wear yields minute rubber particles that can accumulate within an enclosed amusement ride, requiring unwanted costs associated with removal of the particles by a ventilation system or by periodic cleaning of the accumulated particles from surfaces inside the ride.

One solution to the above identified problem is to connect each drive wheel to a steering mechanism or provide an alternative drive system. See, e.g. U.S. Pat. Nos. 2,101,024 and 3,807,312. However, such mechanisms increase the cost of the vehicle and are also somewhat complicated, resulting in increased maintenance costs and more undesirable downtime.

Accordingly, there is a definite need for a transport system having powered wheels that are each steered in an automatic, simple fashion to individually maintain their alignment in a direction parallel to a desired direction of travel to reduce side slip and tire wear.

SUMMARY OF THE INVENTION

The present invention is embodied in a transport system having powered wheels that are each steered in an automatic, simple fashion to individually maintain their alignment in a direction parallel to a desired direction of travel to reduce side slip and tire wear.

The present invention relates to a transport system for moving along a track on a support surface. The transport system includes a body, a guide system mounted to the body and a powered self-steering caster assembly. The guide system cooperates with the track to apply lateral forces to the body to guide it along a predetermined path when a driving force is applied to the body. The powered self steering caster assembly is mounted to the body and has a pivot joint and a wheel. The wheel is rotatably mounted to the caster assembly to engage the support surface. The wheel is powered by a motor to roll the wheel about a center of rotation in a forward direction along the support surface. The pivot joint is mounted for rotation of the wheel about a predetermined axis intersecting the support surface in front of the engagement between the wheel and the support surface. The wheel rotates about the predetermined axis in response to frictional side slip forces between the wheel and the support surface. The wheel is free of restraint from a steering linkage actively controlling the position of the wheel in response to the direction of the track.

One feature of the invention is the self-steering action of the wheel on the self-steering caster assembly, which advantageously reduces wear. In particular, because the wheel steers itself in response to the side slip forces instead of skidding sideways, the wheel is subject to less wear. Such self-steering of a powered caster is counter-intuitive because one of skill in the art would expect a powered caster to fail because of inherent instability. In other words, prior to the discovery of the invention, intuition would have dictated that a powered caster would fail by merely spinning around about its own pivot axis instead of efficiently moving the body. Furthermore, due to the self-steering feature, the wheel aligns itself with the travel path of the pivot joint to effectively provide driving and braking forces parallel thereto.

In a more detailed aspect of the invention, the transport system includes a damper mounted between the body and the rotating portion of the powered self-steering caster assembly. This damper advantageously reduces undesirable vibration that may be caused by the effect of the side slip forces on the wheel and the wheel's reaction thereto. This damper advantageously allows the operation of the caster assembly at speeds greater than those available without such a damper.

Another embodiment of the invention provides a transport system for moving along a path having side edges, each of which is located adjacent to an inclined curb. A powered self steering caster assembly is mounted on a body and pivots in response to engagement with the inclined curbs to guide the body along a predetermined path. This embodiment has the advantage that, other than the inclined curbs, no other guide apparatus, such as a bogey, is needed to allow the powered self steering caster assembly to steer the body along the predetermined path. Thus, this transport system can be manufactured and operated in a less costly manner.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

The following drawings illustrate the preferred embodiment of the invention. In such drawings:

FIG. 1 is a side view of a guest conveying device according to a first embodiment of the present invention;

FIG. 2 is a top view of the guest conveying device of FIG. 1;

DESCRIPTION OF THE PREFERRED EMBODIMENTS

Figure 3:
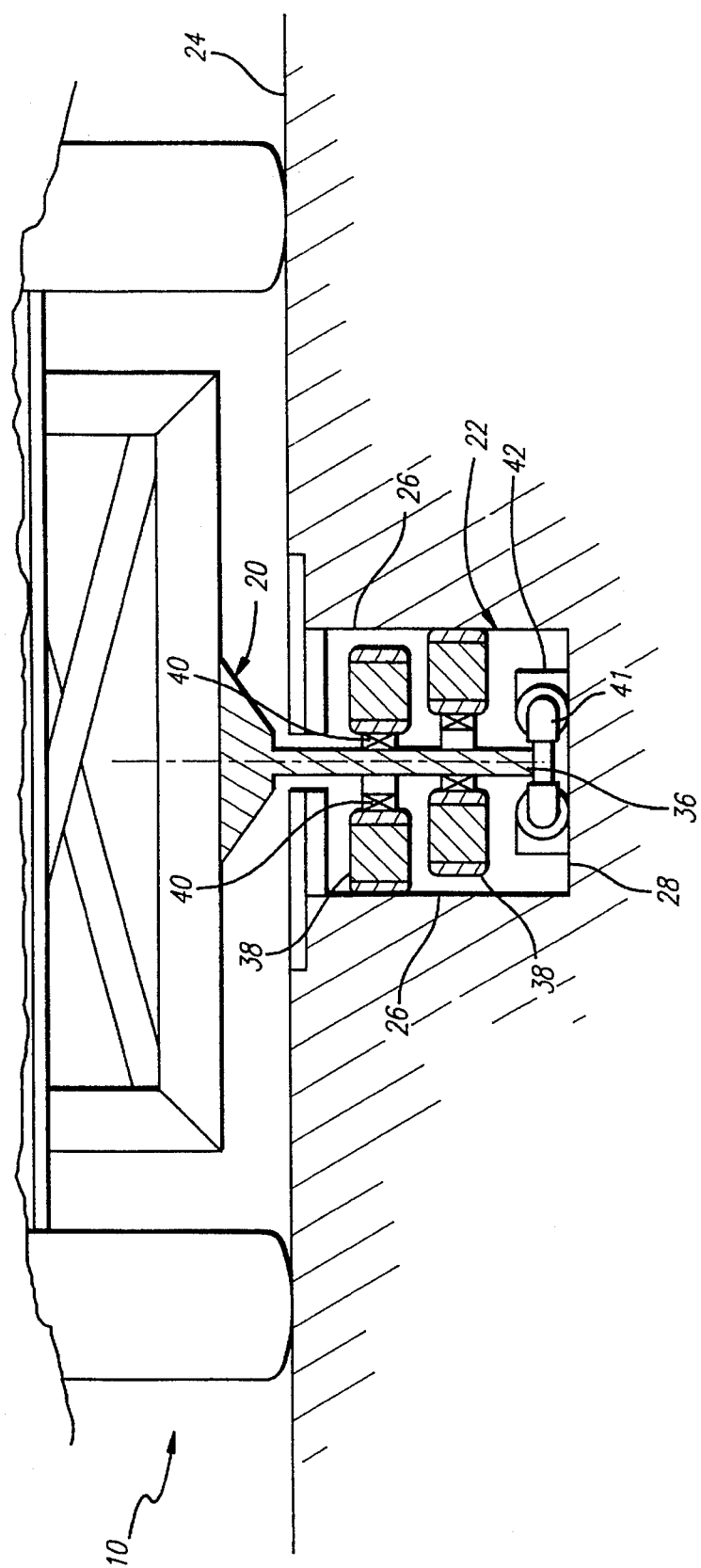
FIG. 3 is a front view, shown in partial cross section, of the guest conveying device of FIG. 1.

As shown in FIGS. 1 and 2 of the exemplary drawings, the present invention is embodied in a guest conveyance system, generally referred to by the reference numeral 10, having a body 12, seats 14, two front-mounted powered self-steering caster assemblies 16, two rear-mounted, unpowered caster assemblies 18, and two bogies 20 engaging a track 22 located along a predetermined path. The powered self-steering caster assemblies provide propulsive and braking forces to move the body while steering themselves along a support surface 24 along the predetermined path. Because the caster assemblies steer themselves, tire wear due to side slip forces is advantageously reduced without the need for a system to actively steer the casters in response to the direction of the track to steer the body along the predetermined path.

The body 12 and the seats 14 of the preferred guest conveyance system 10 are configured to have the appearance of an automobile having a longitudinal axis A. Doors (not shown) or any other entry mechanism well known in the art can be mounted on the body to allow guest access to the seats. The body is positioned above the track 22, which has two opposing walls 26 and a bottom surface 28.

As shown in FIG. 2, the body has a beam 30 having two ends 32 and a midpoint 34. Each powered self-steering caster assembly 16 is mounted to one end of the beam (See FIG. 4). The midpoint of the beam is rotatably mounted to the other body components and to allow the beam to rotate with respect to the rest of the body. The rotation of the beam occurs in a vertical plane passing through the length of the beam. Because the beam rotates in such a vertical plane, the ends 32 of the beam 30 can move up and down to allow the powered caster assemblies to travel up and down over irregularities in the support surface 24. This arrangement also allows the weight of the other body components and the passengers to be supported at the midpoint 34 of the beam, thereby tending to provide approximately equal weight distribution to each powered caster assembly 16. Such a weight distribution tends to increase the steering stability of each caster assembly. Alternatively, as required by a specific application, the powered self-steering caster assemblies 16 can be mounted directly to the body 12 without the use of the beam arrangement described above.

As shown in FIGS. 1 and 3, the bogies 20 project from the underside of the body 12 into the track 22 and are longitudinally spaced apart to prevent the pivoting of the body about the points where the bogies engage the track. Each bogie has a central shaft 36 with two offset rollers 38 mounted thereon. The offset rollers are mounted to the central shaft about laterally spaced centerpoints to allow each roller to contact and roll along only one associated wall 26 of the track 22 as the body moves forward. Bearings 40 are located between the central shaft and each roller to allow the rollers to freely rotate from contact with the walls of the track. The rollers are made from urethane, or any other suitable material well known in the art. The guest conveyance system 10 also has an electrical system (not shown) that draws electricity from brushes 41 mounted to the forward bogie 20 to engage electrically charged rails 42, as is well known in the art. It should be appreciated that other apparatus well known in the art can be utilized to guide the body, such as a track having an inverted T-shaped guide rail (not shown) configured to accept rollers on either side thereof.

Figure 4:
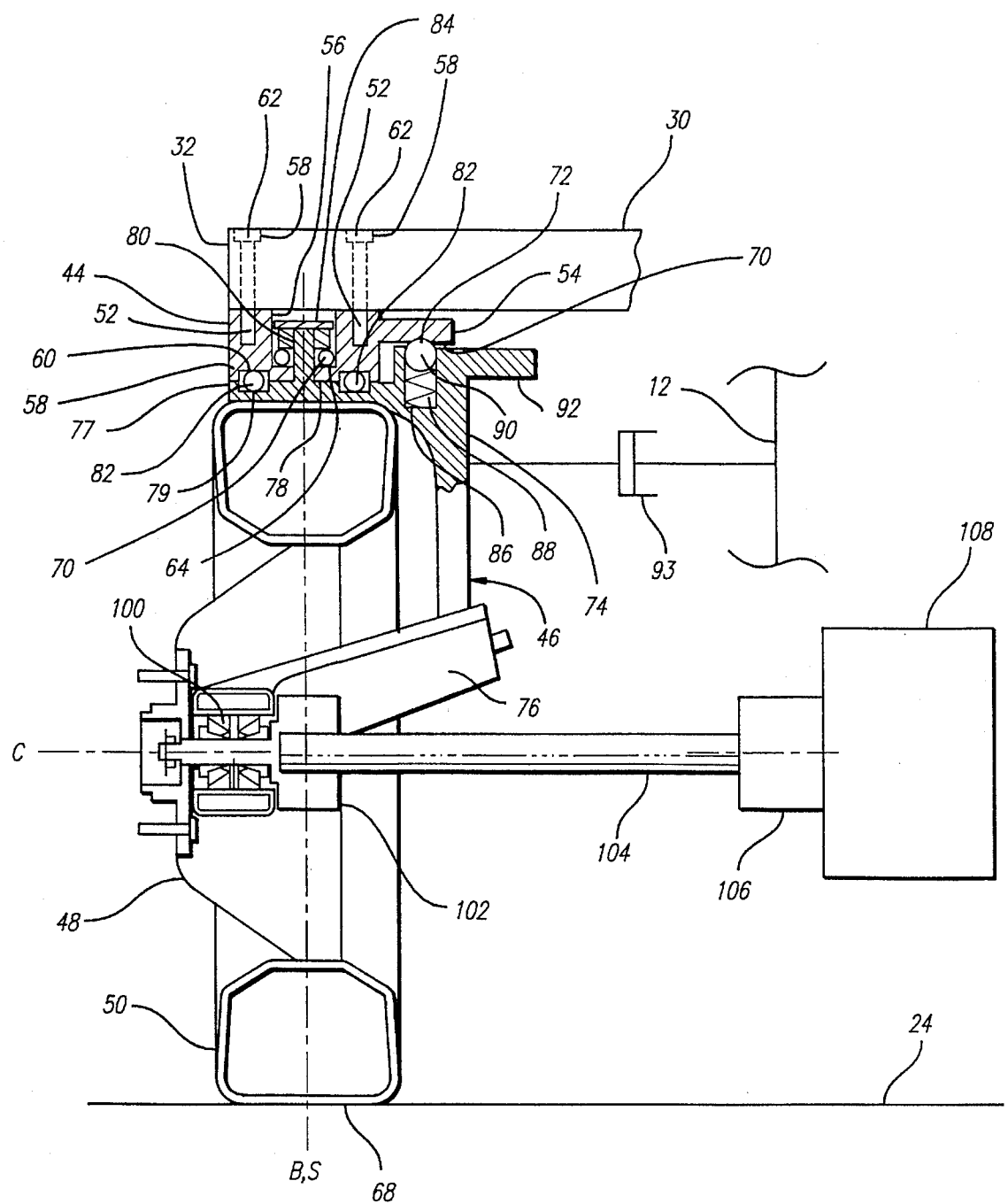
FIG. 4 is a cross-sectional view of a self guided powered caster assembly from the guest conveyance device, taken along lines 4—4 of FIG. 2.
Figure 5:
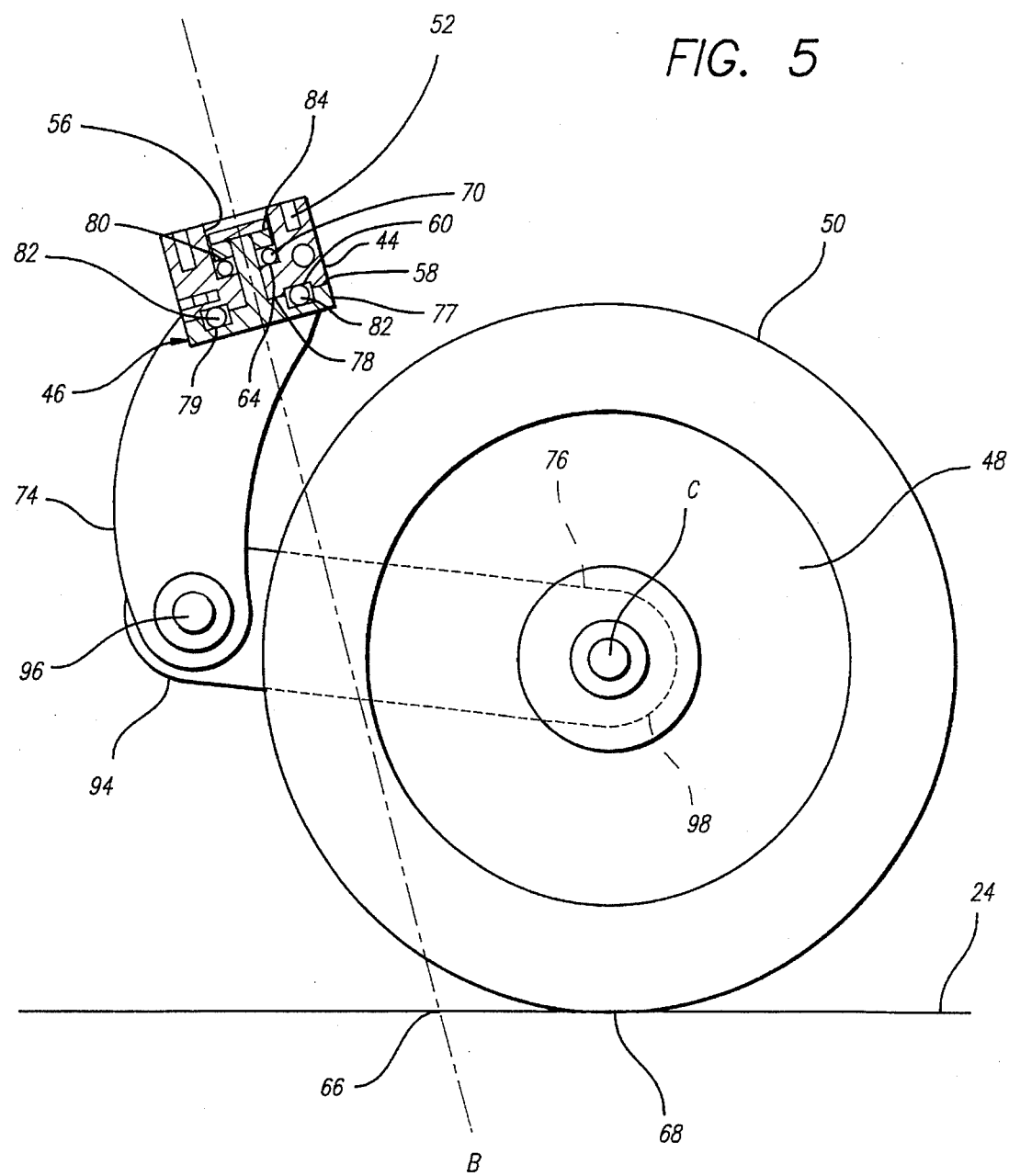
FIG. 5 is a side view, shown in partial cross section, of the powered caster assembly from the guest conveyance device of FIG. 1.

With reference now to FIGS. 4 and 5, one of the powered self-steering caster assemblies 16 will now be described, beginning in the area of its upper connection to the beam 30 and progressing downwardly to the area where the caster assembly rests on the support surface 24. The powered self-steering caster assembly 16 includes a base 44 mounted to the beam 30, a bracket 46 pivotably connected to the base 44 and wheel 48 and tire 50 mounted on the bracket for engagement of the support surface 24.

The base 44 on the upper end of the caster assembly includes bolt holes 52, a flange 54, a central bore 56 defining an axis B, and a lower surface 58 that defines a circular groove 60. The bolt holes 52 are threaded to engage bolts 62 extending from holes 58 in the beam 30. The bolts hold the powered caster assembly 16 to the beam 30. The central bore 56 of the base is countersunk and, thus, has an upper diameter that is larger than its lower diameter, which is located adjacent to the lower surface 58 of the base. A horizontal surface 64 provides a transition between the upper and lower diameter of the bore. The axis B of the central bore 56 intersects the support surface 24 at a point 66 in front of an area of engagement 68 between the tire 50 and the support surface 24. It should be noted that the area of engagement 68 between the tire 50 and the support surface 24 is known as the contact patch. The bore's axis B is also aligned with a plane S passing symmetrically through the center of the tire's circumference. A first set of bearings 70 rests against the horizontal transition 64 of the bore to rotatably hold the bracket 46 to the base 44, as described below.

As shown in FIG. 4, the flange 54 of the base projects radially inwardly in a direction toward the longitudinal axis A of the body 12. The flange has a lower surface 70 that defines a plurality of detents 72 located along an arc having a predetermined radius from the axis B of the central bore 56.

Referring again to both FIGS. 4 and 5, the bracket 46 has an upper arm 74 and a lower arm 76. The upper arm 74 has a horizontal projection 77 that pivotably engages the base 44. The bracket's lower arm 76 holds the wheel 48 and tire 50. The horizontal projection 77 of the upper arm 74 includes an upper surface 78 that defines a circular groove 79 aligned about the axis B of the central bore 56 of the base 44. A cylindrical kingpin 80 projects from the upper surface 77 of the bracket 46 into the bore 56 of the base 44. Thus, the kingpin connects the base and the bracket to allow the bracket to rotate about the central bore axis B of the bracket.

The groove 78 in the bracket has the same diameter as the groove 60 on the lower surface 58 of the base and is located in opposed alignment with the base's groove to hold a second set of bearings 82 therebetween. These bearings also facilitate the rotation of the bracket 46 with respect to the base 44.

The kingpin 80 has an enlarged head 84 sized to abut the ball bearings 70 on the horizontal transition surface 64 inside the bore 56 of the base 44. Such an enlarged head can be formed by various processes or designs well known in the art, such as by a nut threadedly engaged with the kingpin shaft or a disk welded onto the end of the kingpin shaft.

It should be appreciated that the bracket 46 and the base 44 cooperatively function as a pivot joint to allow the rotation of the wheel 48 and tire 50 about axis B. Such rotation can be provided by other well known pivot joints, such as by ball-type joints commonly found in automobile and light truck suspensions. For example, a pivot joint could be constructed from two vertically aligned ball-type joints to provide an axis of rotation for the powered caster assembly 16. This axis of rotation would intersect the support surface 24 in front of the contact patch 68 where the tire 58 contacts the support surface 24. Such ball joints can be readily mounted to a circular bracket mounted to the steering knuckle of a vehicle, such as a light truck. Such a bracket would have a central hole therein to allow power train components to pass through and connect to the wheel. In addition, conventional automotive brakes (not shown) can be mounted on the powered caster assembly to engage the wheel and provide braking for the body.

As shown in FIG. 4, the upper arm 74 of the bracket 46 also defines a cylindrical hole 86 located laterally inwardly of the kingpin 80. This hole 86 is aligned with the arc upon which the detents 72 are formed on the flange 54 of the base 44. Inside the hole, a spring 88 biases a ball 90 projecting upwardly from the hole to engage and disengage the detents 72 to stabilize the rotational movement of the bracket 46 with respect to the base 44 and to also allow the wheel 48 to be held in a particular position if the body 12 is moved backwards for maintenance operations. It should be noted that, for the sake of clarity, the area of engagement between the base 44 and the upper arm 74 of the bracket 46 is shown in cross section in FIG. 4, even though these components are not located on line 4—4 of FIG. 1.

The upper arm 74 of the bracket 46 also has a horizontal rod 92 that extends laterally inwardly from the ball 90 to provide a point for attachment of one end of a common automotive shock absorber (not shown). As is well known in the art, the other end of the shock absorber can be attached to the lower arm 76 of the bracket 46 to cushion the body 12 as the tire 50 goes over bumps in the support surface 24. An optional viscous damper 93 can be mounted between the upper arm 74 of the bracket 46 and the body 12.

Now referring to both FIGS. 4 and 5, the upper arm 74 of the bracket 46 projects downwardly to pivotally engage a forward end 94 of the lower arm 76 at pivot pin 96. The lower arm 76 has a rear end 98 holding a set of wheel bearings 100 that allow a universal joint 102 to spin and rotate the wheel 48 and tire 50. The universal joint 102 is coupled to an axle 104 coupled to another universal joint 106, which is, in turn, coupled to a motor 108. As is well known in the art, the universal joint 102 coupled to the wheel 48 is splined to allow it to lengthen as required to accommodate the pivoting of the wheel 48, which causes the center of the wheel 48 to move closer to and farther away from the motor 108. The universal joints 102 and 106 and axle 104 transmit propulsive and dynamic braking forces from the motor 108 to the tire 50 to accelerate or decelerate the body 12. Alternatively, the motor 108 can be mounted directly to the wheel 48 and tire 50. The electrical system (not shown) supplies the motor with electrical power from the brushes 41. It should be appreciated that other types of motors well known in the art can be used to power the self-steering caster assembly 16, including internal combustion motors.

Figure 8:
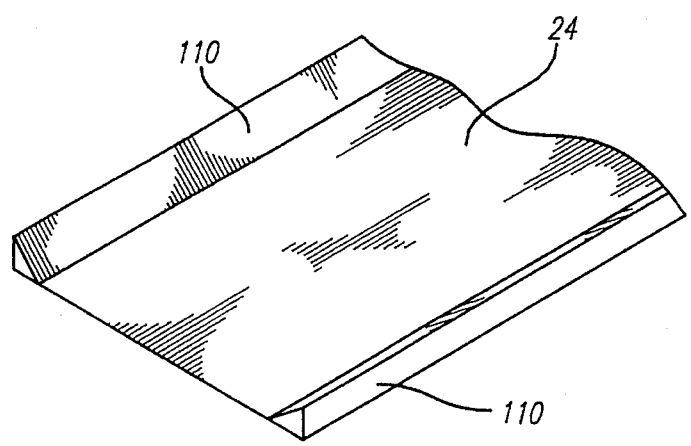
FIG. 8 is a perspective view of a track having side edges adjacent to inclined curbs according to a second embodiment of the invention.

As shown in FIG. 8, a second embodiment of the invention utilizes inclined curbs 110 located along the edges of the support surface 24. This second embodiment utilizes every component of the first embodiment except the bogies 20, the track 22, the brushes 41 and the electric rails 42. The inclined curbs of this embodiment allow the guest conveyance system 10 to travel along a predetermined path without the bogies 20 and track 22 of the first embodiment. Specifically, when the powered caster assemblies 16 encounter the inclined curbs, they will steer themselves back onto the support surface 24 to steer the body 12 along the predetermined path.

Now the operation of the preferred guest conveyance system 10 will be described. The seats 14 mounted on the body 12 hold passengers (not shown) that are to be transported through an attraction along the predetermined path. Once the passengers are onboard, the motor 108 is energized to rotate the universal joint 106, axle 104, and the other universal joint 102, which, in turn, transmit rotational movement to the wheel 48 and tire 50 of each powered caster assembly 16 to move the body 12 along the predetermined path. As the body of the guest conveyance system travels, the motor 108 can be energized and deenergized to provide propulsive and dynamic braking forces, respectfully.

Figure 6:
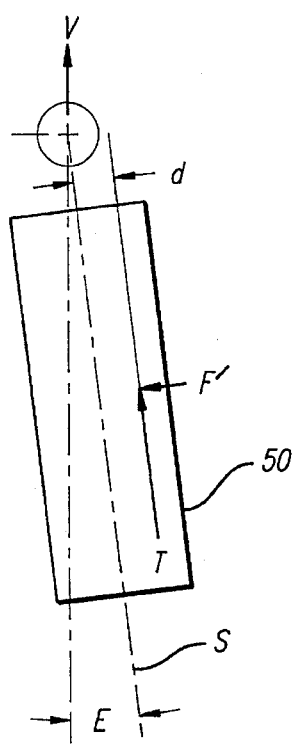
FIG. 6 is a top schematic view of the self-steering powered caster assembly of FIG. 4, showing a tire in an equilibrium steer angle.
Figure 7:
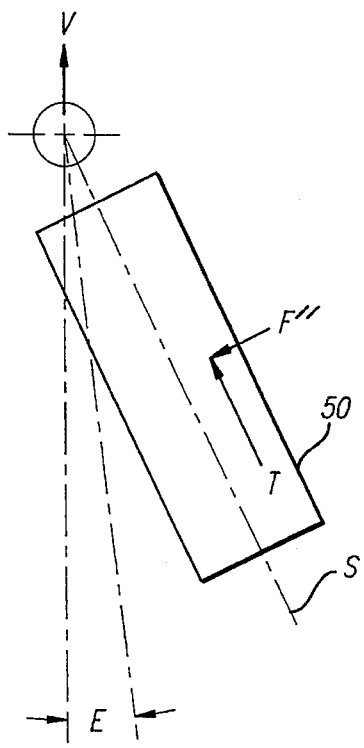
FIG. 7 is a top schematic view of the self-steering powered caster assembly of FIG. 4, showing the tire in a non-equilibrium steer angle.

When the predetermined path curves, the track 22 curves as well to impart lateral cornering forces on the bogie rollers 38. As the body 12 turns, the tires 50 on the powered self-steering caster assemblies 16 automatically maintain their orientation in the equilibrium steer angle. As shown in FIG. 6, the equilibrium steer angle for a particular powered caster is that angle at which the plane of symmetry S of the tire 50 is almost aligned with the velocity vector V of the kingpin 80. Because of the inherent imperfections of the tire 50, the net tire traction force T is offset with respect to the kingpin. Such offset, shown as distance d, causes a moment to act on the powered caster about the kingpin. This moment causes the tire to pivot until the moment is counterbalanced by frictional force F' acting on the tire. Angle E represents the angular differential between the plane of symmetry of the tire and the kingpin's velocity vector when the tire is at the equilibrium steer angle. The angular difference E is believed to be relatively small, therefore, it should be noted that FIG. 6 shows an exaggerated angular differential E for the sake of clearly illustrating the forces involved. As shown in FIG. 7, when the tire 50 is not aligned with the equilibrium steer angle, increased side slip forces F" act perpendicular to the tire to pivot the tire and wheel back into the equilibrium steer angle. The more the tire 50 deviates from the equilibrium steer angle, the greater these side slip forces become, thereby resulting in enough force to return the tire to a stable position at the equilibrium steer angle.

The bracket 46, wheel 48 and tire 50 of the powered self-steering caster assembly 16 behave like a second order harmonic oscillator. Because such an oscillator can vibrate in an undesirable manner, the optional viscous steering damper 93 may be mounted between the body 12 and the bracket to dampen the rotational movement of the wheel 48 and tire 50 about the central bore axis B. The powered caster assembly 16 should include the optional viscous damper if either the damping ratio is low (e.g., 0.3 or less) or the wheel rotation frequency is close to the natural frequency of oscillation. Preferably, the optional viscous damper is included if the powered caster assembly operates at speeds above approximately 25 miles per hour.

The natural frequency of oscillation of the powered caster assembly 16 dictates how quickly the tire 50 will steer to an equilibrium angle wherein the tire 50 is generally positioned parallel to that small portion of the predetermined path upon which it is riding. The steer profile of the powered caster assembly is the time history of the tire's rotational movement about axis B. If the frequency content of the steer profile approaches or exceeds approximately 20 percent of the natural frequency of the powered caster assembly, then the tire 50 may slip excessively. In other words, the caster assembly may not steer itself fast enough to maintain alignment with the predetermined path.

The natural frequency of the powered self-steering caster assembly 16 is given by the following equation:

$$\omega = \sqrt{\frac{C \cdot r}{J}}$$

Further, the damping ratio of the powered caster assembly is given by the following equation:

$$\zeta = \frac{1}{2 \cdot V} \cdot \sqrt{\frac{C \cdot r^3}{J}}$$

where:

$\omega$=natural frequency in rad./sec.;

$\zeta$=damping ratio without the optional viscous damper;

C=cornering stiffness of the tire in lb./rad.;

r=caster trail in ft. (e.g., the distance from the contact patch to the point where the axis B of the base's bore intersects the support surface 24);

J=polar moment of inertia of steered mass about the kingpin in sl.ft.$^2$; and

V=speed of the kingpin in ft./sec.

Corning stiffness is a factor that is well known in the automotive arts and defined in society of automotive engineers publication entitled *Appendix B Vehicle Dynamics Terminology* SAE J670b, published in June, 1970.

The optimal caster trail (r) is given by the following equation:

$$r = \sqrt{\frac{J_p}{m}}$$

where:

$J_p$=Polar moment of inertia of the steered mass about the contact patch in sl.ft.$^2$; and m=steered mass in sl.

The above equation for caster trail (r) leads to the highest possible natural frequency $\omega_n$ for a given set of mass properties $J_p$ and m. It should be appreciated that the polar moment of inertia (J) of the powered caster assembly about its kingpin is equal to $J_p + mr^2$.

Because the tires 50 of the powered caster assemblies 16 steer themselves to maintain their orientation in the equilibrium steer angle, they do not skid in response to side slip forces, and therefore wear less as compared to conventional fixed drive wheels. Such self-steering of a powered caster is counter-intuitive because one of skill in the art would expect a powered caster to fail because of inherent instability. In other words, prior to the discovery of the invention, intuition would have dictated that a guest conveyance system having a powered caster would fail because the powered caster would merely spin around about its own pivot point instead of efficiently moving the body. Furthermore, as compared to conventional steered drive wheels, the powered caster needs no steering linkage, resulting in advantageous cost savings.

It will, of course, be understood that modifications to the presently preferred embodiment will be apparent to those skilled in the art. Consequently, the scope of the present invention should not be limited by the particular embodiment discussed above, but should be defined only by the claims set forth below and equivalents thereof.

We claim:

1. A transport system for moving along a track on a support surface, comprising:
   a body;
   a guide system mounted to the body for cooperation with the track to apply lateral forces to the body to guide it along a predetermined path when a driving force is applied to the body; and
   a powered self-steering caster assembly mounted to the body and having a pivot joint and a wheel,
   the wheel rotatably mounted to the caster assembly and engaging the support surface, the wheel powered by a motor to roll the wheel about a center of rotation in a forward direction along the support surface, and
   the pivot joint mounted for rotation of the wheel about a predetermined axis intersecting the support surface in front of the engagement between the wheel and the support surface to allow the wheel to rotate about the axis in response to frictional side slip forces between the wheel and the support surface, the wheel free of restraint from a steering linkage actively controlling the position of the wheel in response to the direction of the track.

2. The transport system according to claim 1, wherein the motor is mounted to the castor assembly.

3. The transport system according to claim 2, wherein the beam is pivotably mounted to the body for rotation in a vertical plane.

4. The transport system according to claim 1, further comprising a damper mounted between the body and the powered self-steering caster assembly, the damper restraining the rotation of the wheel about the axis of rotation of the pivot joint.

5. The transport system according to claim 1, further comprising another powered self steering caster assembly, and wherein the body includes a beam having two ends, each caster assembly mounted on one end of the beam to distribute load from the body equally among the caster assemblies.

6. The transport system according to claim 1, wherein the body defines a longitudinal axis and the guide system includes two longitudinally spaced guides engaging the track at different locations to prevent the body from rotating with respect to the locations of engagement between the guides and the track.

7. The transport system according to claim 1, wherein the body defines a longitudinal axis and the pivot joint is spaced longitudinally forward of the wheel's center of rotation.

8. The transport system according to claim 1, wherein the powered self-steering caster assembly further comprises a base and a bracket, the base mounted to the body and having a flange defining detents radially distributed around the pivot joint, the bracket including a spring-biased ball mounted in alignment with the detents to engage and disengage the detents as the bracket rotates with respect to the base.

9. The transport system according to claim 1, wherein the guide system defines inclined curbs.

10. A transport system for moving along a track on a support surface, comprising:

a body defining a longitudinal axis;

a guide system mounted to the body for cooperation with the track to apply lateral forces to the body to guide it along a predetermined path when a driving force is applied to the body;

a powered self-steering caster assembly mounted to the body and having a pivot joint and a wheel, the wheel rotatably mounted to the caster assembly and engaging the support surface, the wheel powered by a motor to rotate the wheel about a center of rotation and roll the wheel in a forward direction along the support surface, and the pivot joint mounted for rotation of the wheel about a predetermined axis intersecting the support surface in front of the engagement between the wheel and the support surface to allow the wheel to rotate about the axis in response to frictional side slip forces between the wheel and the support surface, the wheel free of restraint from a steering linkage actively controlling the position of the wheel with respect to the predetermined axis in response to the direction of the track; and a damper mounted between the body and the powered self-steering caster assembly, the damper restraining the rotation of the wheel about the axis of rotation of the pivot joint.

11. The transport system according to claim 10, wherein the body defines a longitudinal axis and the guide system includes two longitudinally spaced guides engaging the track at different locations to prevent the body from rotating with respect to the locations of engagement between the guides and the track.

12. The transport system according to claim 10, wherein the pivot joint is spaced longitudinally forward of the wheel's center of rotation.

13. The transport system according to claim 10, further comprising another powered self steering caster assembly, and wherein the body includes a beam having two ends, each caster assembly mounted on one end of the beam to distribute load from the body equally among the caster assemblies.

14. The transport system according to claim 13, wherein the beam is pivotably mounted to the body for rotation in a vertical plane.

15. The transport system according to claim 10, wherein the powered self-steering caster assembly further comprises a base and a bracket, the base mounted to the body and having a flange defining detents radially distributed around the pivot joint, the bracket including a spring-biased ball mounted in alignment with the detents to engage and disengage the detents as the bracket rotates with respect to the base.

16. The transport system according to claim 10, wherein the motor is mounted to the caster assembly.

17. A transport system for moving along a track on a support surface, comprising:

a body defining a longitudinal axis;

two longitudinally spaced bogies mounted to the body and projecting to engage the track at longitudinally spaced locations to apply lateral forces to the body to guide it along a predetermined path in response to a driving force and to prevent the body from rotating with respect to the points of engagement between the bogies and the track; and two powered self-steering caster assemblies mounted to the body, each having a fixed base mounted to the body, the base having a bore therein aligned along a predetermined axis, a kingpin mounted in the bore of the base for rotation about the predetermined axis, the kingpin having an end projecting from the bore of the base, a bracket mounted to the end of the kingpin for rotation with respect to the base about the predetermined axis, a wheel rotatably mounted to the bracket and rotated by a motor in a forward direction, a tire mounted on the wheel for engagement of the support surface at a location behind a point where the predetermined axis intersects the support surface, the tire pivoting in response to side slip forces from frictional engagement with the support surface, the tire free of restraint from a steering linkage actively controlling the position of the wheel about the predetermined axis in response to the direction of the track.

18. The transport system according to claim 17, further comprising a damper mounted between the body and each powered self-steering caster assembly, each damper restraining the rotation of the wheel about the predetermined axis.

19. The transport system according to claim 17, wherein the body includes a beam having two ends and a midpoint, and wherein each caster assembly is mounted on one end of the beam and the midpoint of the beam supports the remainder of the body to distribute load from the body equally among the two caster assemblies.

20. The transport system according to claim 19, wherein the beam is pivotably mounted to the body for rotation in a vertical plane.

21. The transport system according to claim 17 wherein the base of each caster assembly has a flange defining detents radially distributed around its bore, and wherein the bracket of each caster assembly includes a spring-biased ball mounted in alignment with the detents to engage and disengage the detents as the wheel of the caster assembly rotates about the predetermined axis.

22. A transport system for moving along a predetermined path having side edges and a support surface therebetween, the transport system comprising:

inclined curbs mounted adjacent to the side edges of the path;

a body;

a powered self steering caster assembly having a pivot joint and a wheel, the wheel rotatably mounted to the caster assembly and engaging the support surface, the wheel powered by a motor to roll the wheel about a center of rotation in a forward direction along the support surface, and the pivot joint mounted for rotation of the wheel about a predetermined axis intersecting the support surface in front of the engagement between the wheel and the support surface to allow the wheel to rotate about the axis in response to frictional side slip forces between the wheel and the support surface, the wheel free of restraint from a steering linkage actively controlling the position of the wheel about the axis in response to the direction of the track.

23. The transport system according to claim 22, wherein the body defines a longitudinal axis and the pivot joint is spaced longitudinally forward of the wheel's center of rotation.

24. The transport system according to claim 22, wherein the caster assembly further comprises a base mounted to the body, the base having a flange defining detents radially distributed around the pivot joint axis, and wherein the caster assembly also includes a spring-biased ball mounted in alignment with the detents to engage and disengage the detents as the wheel of the caster assembly rotates.

25. The transport system according to claim 22, wherein the motor is mounted to the caster assembly.

26. The transport system according to claim 22, further comprising a damper mounted between the body and the caster assembly to restrain the rotation of the wheel about the axis of rotation of the pivot joint.

27. The transport system according to claim 22, further comprising an additional powered self steering caster assembly, and wherein the caster assemblies are mounted on a beam having two ends and a midpoint, each caster assembly mounted on either end of the beam and the midpoint of the beam mounted to the body to distribute load from the body equally among the caster assemblies.

28. The transport system according to claim 27, wherein the beam is pivotably mounted to the body for rotation in a vertical plane.

* * * * *